Patented Aug. 18, 1931

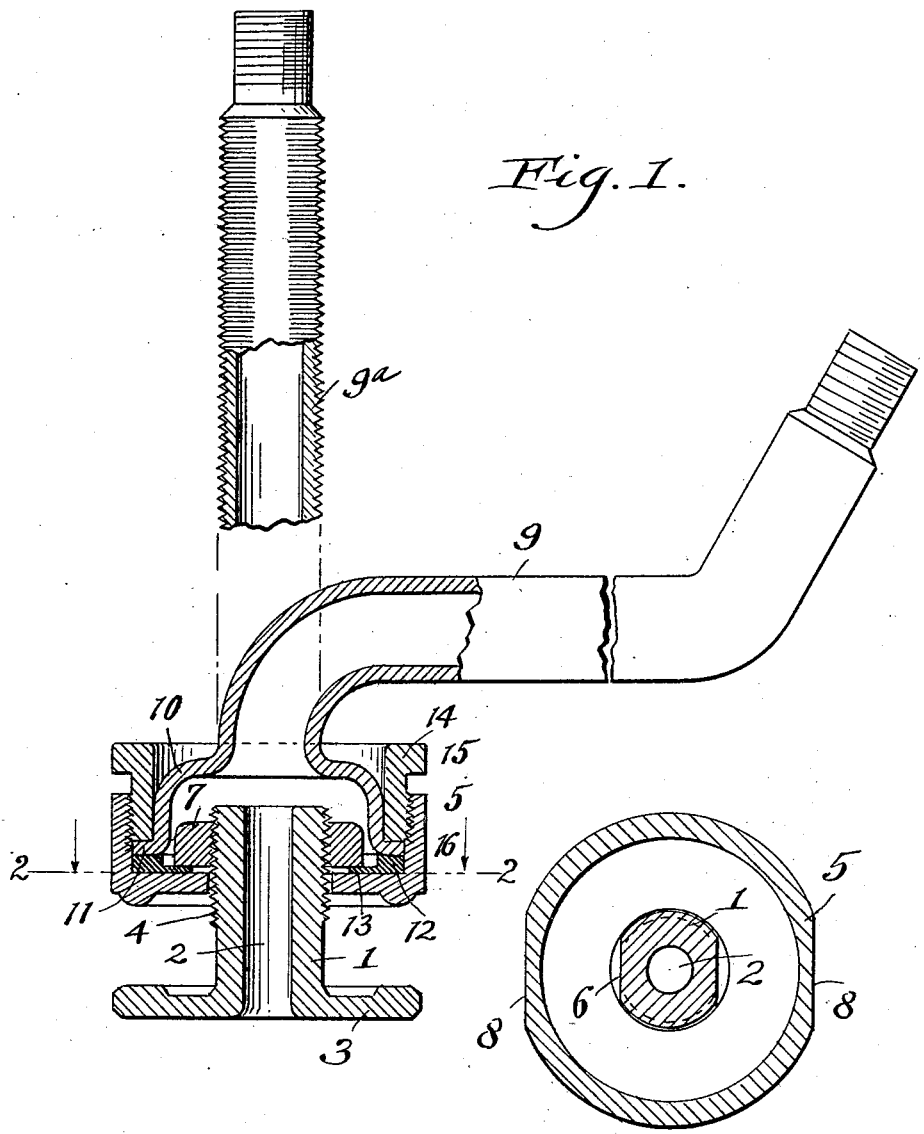

1,819,151

UNITED STATES PATENT OFFICE

JOHN C. CROWLEY, OF CLEVELAND HEIGHTS, OHIO

INTERCHANGEABLE VALVE STEM

Application filed December 16, 1929. Serial No. 414,314.

This invention relates to a valve stem and more particularly to a valve stem provided with an adapter whereby a valve stem of other than the usual standard construction of valve stem may be equipped to use a standard valve insides.

An object is to provide a valve stem construction whereby different forms of adapters may be used so that tire tubes equipped with the valve stem can be used on various types of wheels where it is necessary to have the portion of the adapter containing the valve insides extending toward and located adjacent the rim flange of the wheel or where the adapter may be simply an extension of the stem in axial alignment therewith.

Another object is to provide a valve stem and valve stem adapter formed of a relatively few number of parts which are easily assembled and economically manufactured.

Additional objects and advantages will appear hereinafter.

An embodiment of the invention is illustrated in the accompanying drawings wherein Fig. 1 is a side elevational view of the valve stem and adapter, the valve stem and a portion of the adapter being shown in section, there also being shown two forms of the adapter; and Fig. 2 is a sectional view taken on line 2—2 of Fig. 1.

As is well known, the present type of valve stem is made of a tubular piece of brass which has an externally threaded portion at one end provided with an end part of reduced diameter. The valve stem is formed with a tapered shoulder adjacent its outer end arranged in the central bore through the stem, which shoulder is adapted to receive a portion of a standard valve insides. These valve stems are made of brass in order to permit of easy insertion or removal of the valve insides and prevent the insides from becoming frozen within the stem after they have been inserted therein for a long period of time and subjected to weather conditions encountered in use.

In my co-pending application Serial No. 304,954, filed September 10, 1928, I described a valve stem made of steel or other suitable metal and an adapter formed of non-corroding metal, and a similar arrangement will be set forth in the present application.

There are certain types of wheels which require the portion of the valve stem containing the valve insides to be located adjacent the rim flange of the wheel, while other types of wheels permit the use of a straight valve stem or of a valve stem having a straight adapter portion. This has necessitated the use of different stems upon tire tubes which are to be used with such wheels as large disc wheels than are used upon the ordinary spoke type of wheel. The present invention discloses a valve stem which may be used upon tire tubes irrespective of the type of wheels with which the tubes are to be used and which may have associated therewith adapters to take care of the different conditions arising in connection with the different types of wheels.

The valve stem 1 is a tubular member provided with an internal bore 2 and has adjacent one of its ends a head 3 which is adapted to cooperate with a spreader later to be described, for clamping portions of an inner tube between the head and the spreader. The end of the stem 1 opposite the head 3 is externally threaded, as indicated at 4. A member 5 in the form of a cup-shaped ring washer is arranged on the stem and is provided with a central hole having flats on its circumference which cooperate with the flats 6 on the valve stem to prevent relative rotation between the member 5 and the valve stem. The tire tube is clamped between the head 3 of the valve stem 1 and the base of the member 5 by means of a nut 7 arranged on the exteriorly threaded portion 4 of the valve stem. When the nut 7 is screwed down upon the valve stem to move the member 5 toward the head 3 to clamp the tire tube therebetween, a wrench may be applied to the flats 8 on the member 5 to hold this member and the stem from rotating while the nut is being tightened. An adapter or extension is indicated at 9, such adapter being either of a curved form or of straight form, as shown at 9ª in Fig. 1, it being understood that in both forms of adapter the outer end thereof is provided with a suitable bore for receiving the standard valve insides. The end of the adapter or extension which cooperates with the stem 1 and member 5 is formed with an inverted cup-shaped portion 10 having an outstanding peripheral flange 11 which, in the assembled position, lies within the member 5 and bears upon a ring washer or packing 12 arranged in the base of the member 5. This ring washer or packing 12 may be provided with an inwardly extending portion 13 adapted to lie between the nut 7 and the base of the member 5. The extension or adapter is held in the member 5 by a ring nut 14 having exterior threads 15 which cooperate with interior threads 16 formed on the wall of the member 5.

It is apparent that when the nut 14 is screwed into the cup-shaped member 5 the lower edge of the nut will bear upon the flange 11 of the inverted cup portion 10 of the extension and force such flange against the ring packing 12, thereby forming an airtight seal, which seal, together with the seal provided by having the portion 13 of the packing arranged between the nut 7 and the base of the member 5, adequately prevents the escape of air at the point of connection between the valve stem 1 and the extension 9.

It should be noted that the member 5 may be assembled with the valve stem 1 and the tire tube clamped therebetween before the extension 9 is applied to the stem, and since these extensions are made in various sizes and forms to fit different makes of tire rims, it will be possible to attach the extensions to the stems without disturbing the seal connection between the member 5 and the stem 1.

Although a preferred embodiment of the invention has been illustrated and described herein, it should be understood that the invention is susceptible of various modifications and adaptations within the scope of the appended claims.

Having thus described my invention, I claim:

1. In combination, a valve stem having a head at one end adapted to be arranged within a tire tube and an exteriorly threaded portion at its other end, a cup-shaped member arranged on said valve stem so as to have longitudinal movement thereon, a nut arranged on said exteriorly threaded portion of the stem and within said cup-shaped member for holding the latter in position on the stem to clamp a tire tube between the head on the stem and the base of said member, an extension or adapter having a flanged portion arranged in said cup-shaped member, and means associated with said cup-shaped member and cooperating with the flanged portion of said adapter or extension for maintaining the adapter or extension in air-sealed, assembled position with respect to said member and said stem.

2. In combination, a valve stem having a head at one end adapted to be arranged within a tire tube and an exteriorly threaded portion at its other end, a cup-shaped member arranged on said valve stem capable of longitudinal movement thereon, a ring washer arranged in said cup-shaped member, a nut arranged on said threaded portion of said valve stem and within said cup-shaped member for holding the latter in tire clamping position with respect to the head of the valve stem, an adapter or extension having an inverted cup-shaped portion provided with an outwardly extending peripheral flange arranged in said cup-shaped member, and an externally threaded member cooperating with an internally threaded portion of said cup-shaped member and engaging said outstanding peripheral flange on the adapter or extension for maintaining such flange in air-sealed engagement with said washer.

In testimony whereof, I hereunto affix my signature.

JOHN C. CROWLEY.